United States Patent
Tognazzini

(10) Patent No.: US 6,614,986 B2
(45) Date of Patent: *Sep. 2, 2003

(54) DELAYED DECISION RECORDING DEVICE

(75) Inventor: Bruce Tognazzini, Woodside, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/765,581

(22) Filed: Jan. 22, 2001

(65) Prior Publication Data

US 2001/0051032 A1 Dec. 13, 2001

Related U.S. Application Data

(63) Continuation of application No. 08/608,372, filed on Feb. 28, 1996, now Pat. No. 6,263,147.

(51) Int. Cl.[7] .................................................. H04N 5/91
(52) U.S. Cl. ............................... 386/46; 360/5; 360/7; 369/7
(58) Field of Search ......................... 386/46, 1, 4, 52, 386/55; 360/5, 7; 369/7; 348/552, 553; H04N 5/91

(56) References Cited

U.S. PATENT DOCUMENTS

| 4,706,121 A | 11/1987 | Young |
| 4,821,121 A | 4/1989 | Beaulier |
| 4,963,995 A | 10/1990 | Lang |
| 5,103,467 A | 4/1992 | Bedlek et al. |
| 5,241,428 A | 8/1993 | Goldwasser et al. |
| 5,257,142 A | 10/1993 | Hong |
| 5,345,430 A | 9/1994 | Moe |
| 5,371,551 A | 12/1994 | Logan et al. |
| 5,438,423 A | 8/1995 | Lynch et al. |
| 6,263,147 B1 * | 7/2001 | Tognazzini .................. 386/46 |

FOREIGN PATENT DOCUMENTS

| DE | 3528-643 A | 2/1987 | |
| WO | WO 92/22983 | * 12/1992 | .......... H04N/5/781 |

* cited by examiner

Primary Examiner—Vincent Boccio
(74) Attorney, Agent, or Firm—Finnegan, Henderson, Farabow, Garrett & Dunner, L.L.P.

(57) ABSTRACT

Apparatus, methods and computer program products permit a decision to record time sequential information, beginning at a particular point in time, to be made after that particular point in time. In one implementation, a decision to record a piece of music from the beginning can be made anytime during the playing of the music. In others, a decision to record a video program from the beginning can be made during the program. In a portable video camera, a decision to save a boy's turn at bat can be made after he hits a home run.

6 Claims, 9 Drawing Sheets

DELAYED DECISION RECORDING DEVICE

This application is a Continuation of application Ser. No. 08/608,372 filed Feb. 28, 1996, now U.S. Pat. No. 6,263,147.

BACKGROUND OF THE INVENTION

1. Field of the Invention

This invention relates to improvements in systems and processes for recording information and more specifically for systems and processes in which a decision to record material beginning at a particular point in time be made after that point in time.

2. Description of Related Art

Automobiles are known in which both radios and tape players are installed. Usually, however, tape players do not have a record function. One reason for this may be that by the time a piece of music is recognized and a decision made to record, the music has begun and the opportunity to capture the beginning portion of the music has passed.

Video recorders are also known which can be programmed to receive particular programs at particular times of day on particular channels. Video recorders face the same problem in that, unless pre-programmed in advance, one cannot capture a program from the beginning, after the program has begun.

Portable video recording devices are also known which begin recording the output of a video camera on video tape when a record button is pushed by a user. Consider a person desiring to videotape a wedding. The recorder might fail to record an unexpected event because the record button had not been pushed because nothing worth recording was expected. Similarly, the person recording the wedding might run out of tape at precisely the moment vows are exchanged. Like the other examples, it would be desirable to be able to make a decision to capture events within the view of the camera on tape after those events have occurred.

THE PROBLEM

In each of the electronic devices described above, and in other similar devices, one can often not determine the significance of events until after the events have occurred. It would be desirable to be able to capture, on a recording medium, events which have already occurred.

SUMMARY OF THE INVENTION

The present invention provides a system and process which permits a decision to capture time sequential information beginning at a particular point in time to be made after that point in time.

In one form, the invention permits music to be captured from the beginning even though the decision to record the music occurs after the music has begun.

In another form, the invention permits a video program to be captured from the beginning even though the decision to capture the information is delayed until after the program material has started.

In another form of the invention, a portable video camera is equipped with the capability of recording scenes which occurred prior to the decision to begin recording.

Apparatus is disclosed for recording program material, such as music or a television program, from the beginning, after the beginning of the program material has passed. A source of program material and a recording device are connected by a delayed recording circuit. The delayed recording circuit is configured to introduce delay between the source and the recording device and to selectively activate the recording device to record information from the source from its beginning after it has been delayed. The start or end of a program can be identified by comparing the output of a clock with known program starting times or by receiving program starting and/or stopping information from an external communications link.

The delayed recording circuit can be a digital computer and analog sources or recording devices can be accommodated using analog to digital conversion techniques.

Also disclosed is a process for use with a recording device, receiving different types of information, such as music and voice, from a source in a time sequence, for recording at least a portion of one type of information from its beginning, after its beginning has passed. The process includes reading information from a source into computer memory, identifying the beginning and after the beginning, controlling the recording device to record the one type of information from said beginning as it is read from said computer memory.

Also disclosed is a video camera/recorder which permits the recording of events occurring within the field of view of the camera after the events have occurred by connecting a video camera to a recording device over a delayed recording circuit. The delayed recording circuit is configured to introduce delay between the source and the recording device and to activate, after a particular point in time, the recording device to record information beginning from or before the particular point in time. In one version, the delayed recording circuit is configured to cause the recording device to continue to record information delayed by said delayed recording circuit after a stop button has been pushed until all information delayed up until the time the stop button is pushed has been recorded and to ignore the stop button if a record button is pushed before recording ceases in response to the stop button.

Also disclosed is a computer program product having a computer readable medium containing a process in a computer program form for controlling a computer receiving different types of information from a source in a time sequence, to record at least a portion of one type of information from its beginning, after its beginning had been received by said computer. The process includes reading information from said source into computer memory, identifying said beginning and after the beginning, controlling a recording device to record the one type of information from the beginning as it is read from the computer memory.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF DRAWINGS

The objects, features and advantages of the system of the present invention will be apparent from the following description in which.

NOTATIONS AND NOMENCLATURE

Figure 1:
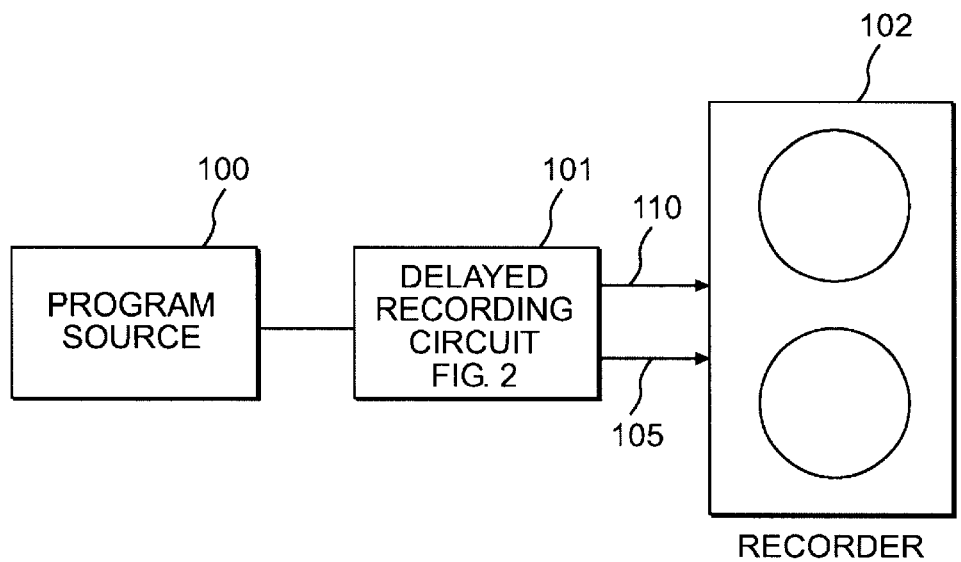
FIG. 1 illustrates at a high level, apparatus which permits a decision to record information beginning at a particular point in time after that point in time.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes apparatus and methods for delaying a decision to record information until after presentation of that information has begun. Three different implementations of the invention are disclosed, each illustrative of the more general principles of the invention. In one, a tape recorder is integrated with a radio in such a way that a decision to record particular music from the beginning can be made after the music has begun. In another, the decision to record video information from a program source, such as a television channel, can be made either (1) within an interval of time after the program begins or (2) at any during the program. In a third, information from a video camera is utilized as the information source and a decision to record can be made after the camera has captured the information.

Operating Environment

The principles of the invention are best integrated with consumer appliances such as radios, video recorders, video cameras and their corresponding commercial counterparts. Microprocessor control of these kinds of appliances are known and the benefits of the invention may be achieved by extending the capabilities of those microprocessors as set forth hereinafter.

The Preferred Embodiment

FIG. 1 illustrates at a high level, apparatus which permits a decision to record information beginning at a particular point in time after that point in time. FIG. 1 shows a program source 100 connected to a delayed recording circuit 101 which controls a tape recorder 102 over a control link 105 and passes information from the program source to the tape recorder via a delay circuit and via link 110 for recording. The program source may be a radio, a video source or may be the output of a video camera. The functionality of the delayed recording circuit 101 is described more in detail in conjunction with FIG. 2 and with implementations based on FIG. 3.

Figure 2:
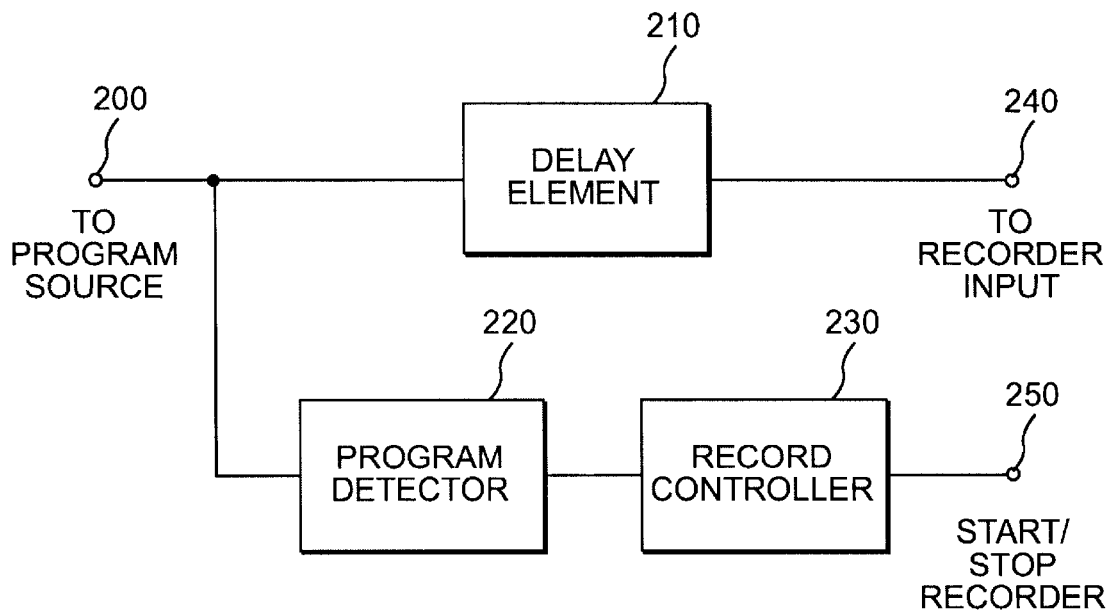
FIG. 2 illustrates in block diagram form the functions of the delayed recording circuit of FIG. 1.

FIG. 2 illustrates in block diagram form the functions of the delayed recording circuit of FIG. 1. Information from program source 100 of FIG. 1 arrives at input 200 of FIG. 2 and is passed to delay element 210 where it is delayed prior to being provided to output 240 from which it will be forwarded to a recording input of a recording device. Input 200 also connects to a program detector 220 which detects the start and end of a particular program to be recorded. Information from the program detector is utilized by record controller 230 to establish the time for turning the recorder on and for stopping the recorder to capture the desired program information as it emerges from the delay element 210 at the output 240.

Figure 3:
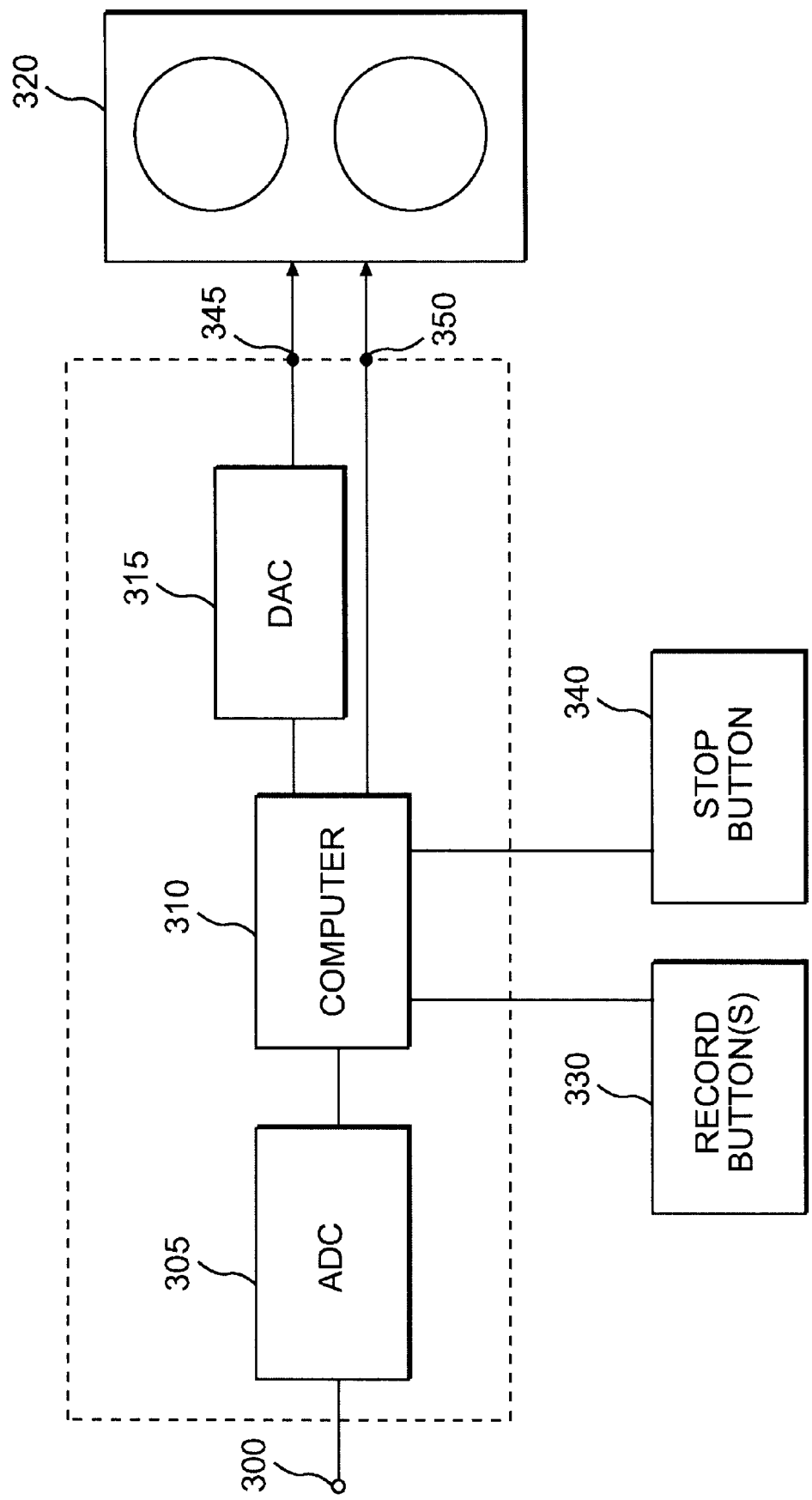
FIG. 3 illustrates a block diagram of a computer implementation of the delayed recording circuit of FIG. 1.

FIG. 3 illustrates a block diagram of a digital computer implementation of the delayed recording circuit of FIG. 1. Information from program source arrives at input 300. If it is in analog form, as shown in FIG. 3, it is converted to digital in analog to digital converter (ADC)305 prior to being stored in computer 310. On the output side, assuming that recorder 320 is an analog recorder, digital information stored in the computer is converted to analog in digital to analog converter (DAC)315 prior to being sent to output 345 where it is applied to the recording input of recorder 320. As described more hereinafter, computer 310 is equipped with an input output interface which permits it to assert a control voltage at output 350 which can be utilized to return recorder 320 on and off at the precisely correct time to capture selected information as it appears at the output 345. Computer 310 is also equipped to receive control signals. Signals from one or more record buttons 330 are sent to the computer 310 over appropriate interface arrangements. Similarly, signals from a reset button 335 and a stop button 340 are connected to the computer.

Figure 4:
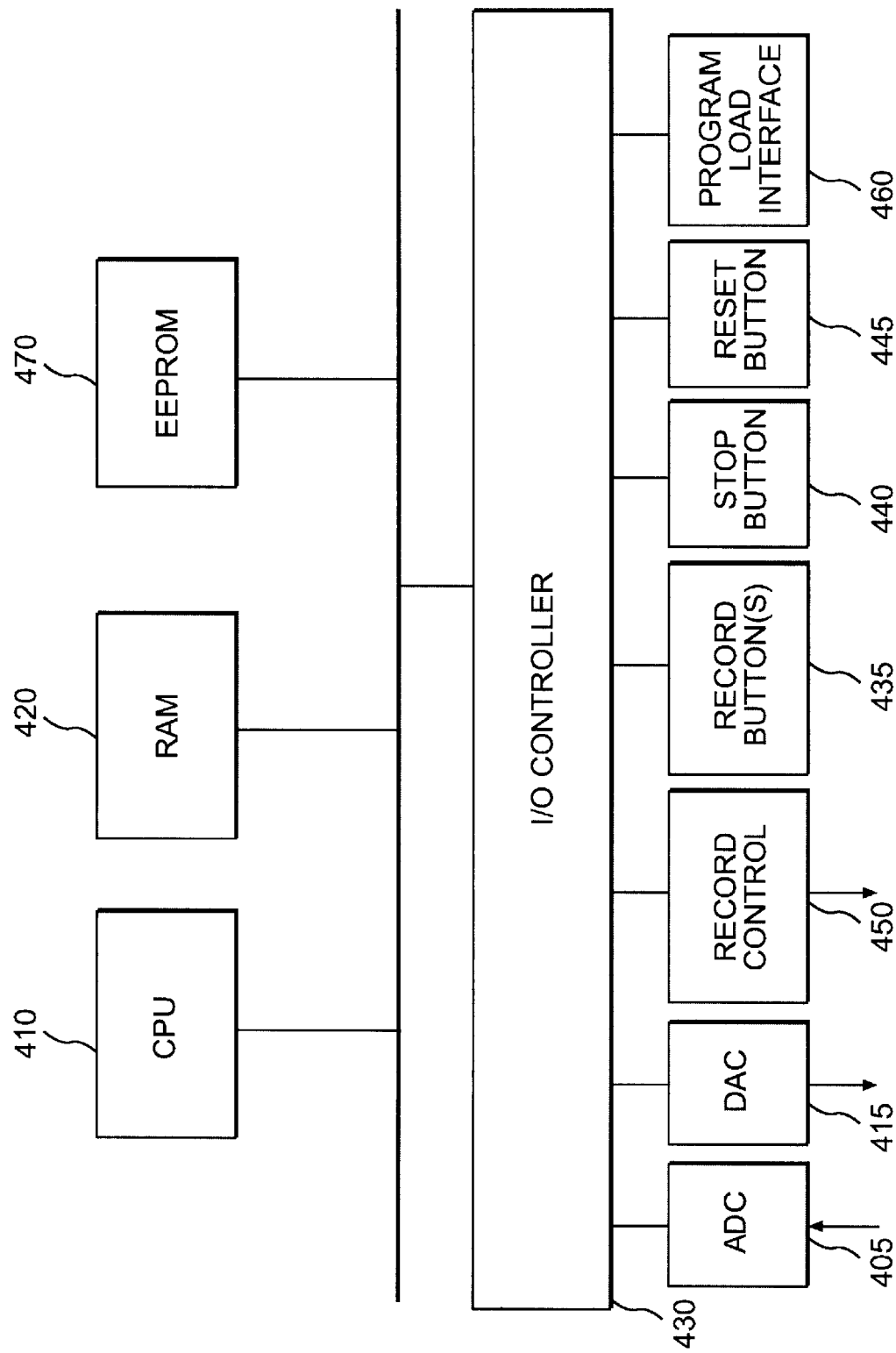
FIG. 4 illustrates the internal structure of a computer suitable for implementation shown in FIG. 3.

FIG. 4 illustrates the internal structure of a computer suitable for the implementation shown in FIG. 3. In traditional fashion, bus 400 serves as an interconnection medium linking the various hardware components forming part of the computer. CPU 410 controls the bus and the processing functions in the computer system. Random Access Memory 420 stores data and program information used by the computer. I/O controller 430 interfaces a number of hardware devices utilized in carrying out the invention. Specifically, I/O controller 430 manages the receipt of information from ADC 405, provides output information to DAC 415, provides record control information to record control 450 and interfaces control switches such as record button(s) 435, reset button 445 and stop button 440. Typically, the I/O controller provides buffering and the control of buffering between external devices and the system bus 400. A program load interface manages the storage of program information into memory 420 or into optional ROM such as EEPROM 470. Program load interface could connect to a disk drive for loading of computer program information from floppy disk or other memory medium into memory or to a communications port.

Although this particular architecture shows only a single bus, performance considerations may dictate the use of a dual ported RAM 420 (with an appearance on each of two buses) and one of two separate buses used for managing only the information from the analog to digital converter 405 or information to the digital to analog converter 415 or both. Such a dual bus arrangement would be preferred when processing video information at a high rate of speed.

Figure 5:
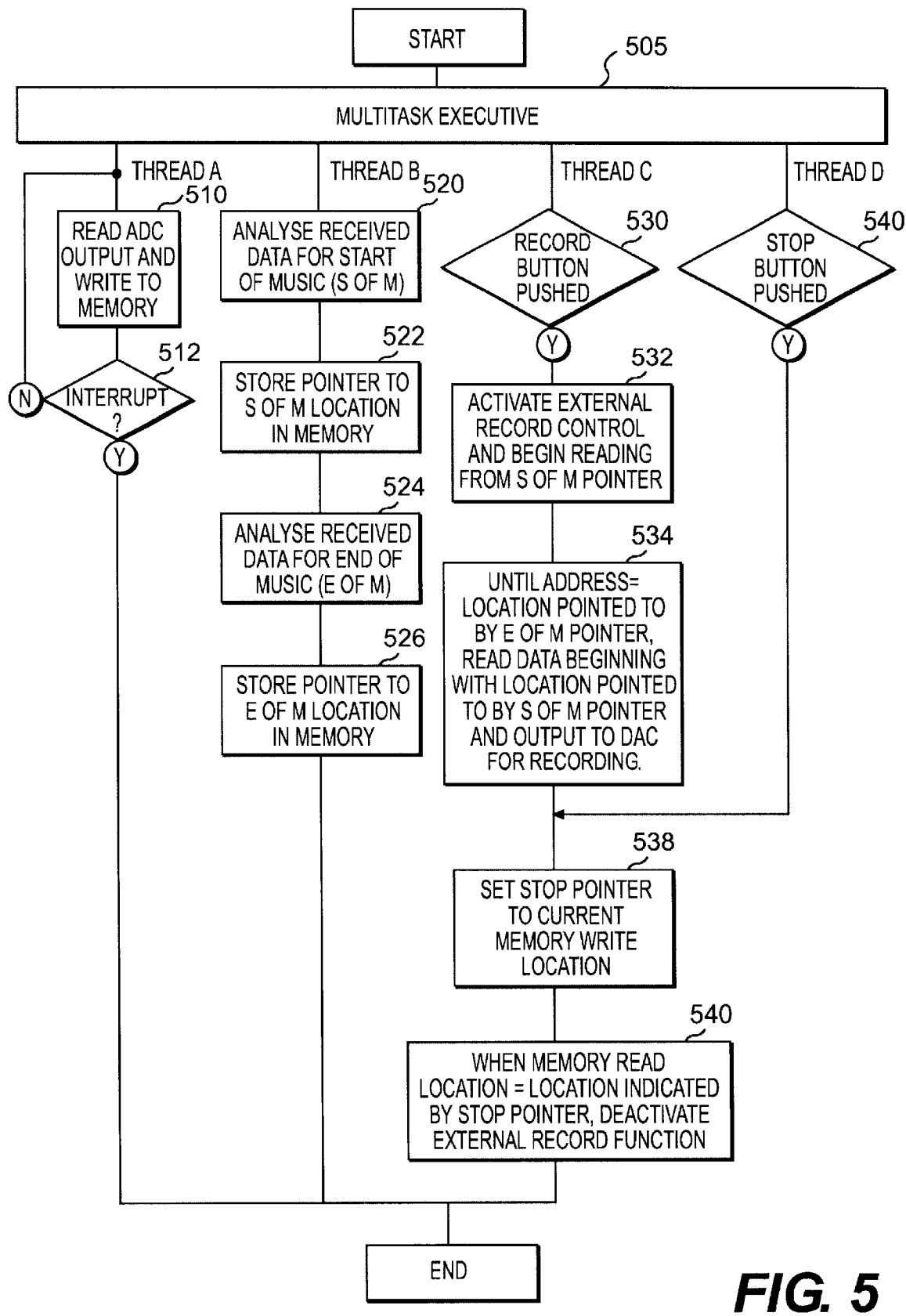
FIG. 5 is a flow chart of software implementing a music capture version of the invention.

FIG. 5 is a flow chart of software implementing a music capture version of the invention. A multi task executive 505 allocates processing time to four separate tasks or threads which operate somewhat concurrently. In this implementation, one may assume that the program source is a radio and that the user desires to record desirable songs from the radio onto tape. Thread A manages the receipt of information from ADC 305 of FIG. 3 and the storage of that information in the computer's RAM. Preferably, a large enough block of information is set aside so that even the longest songs can be captured in memory before memory is used up and needs to be overwritten. The writing process set forth in thread A at 510 is a continuous process in which data is fed to a block of memory and written into memory locations consecutively until the end of the memory block is reached, at which time writing continues beginning with the start of the memory block. Thus, data is continuously written in a cyclical fashion beginning with the start of the allocated block through the end of the allocated block and then back to the beginning. Although the writing of data from the ADC to memory occurs substantially continuously, there is an opportunity to manually interrupt at block 512 of thread A.

As the data is loaded or, after the data has been stored, the received data is analyzed for a start of music indication (520-thread B). Techniques for distinguishing music from voice or other types of audio information are well known in the art. In one form, the data is processed by what is essentially a spectrum analyzer to determine the amount of energy in various components of the frequency spectrum. When the start of music is identified, it is identified with reference to data which either has been or is being stored in memory. A pointer to the memory location where the start of music occurs is stored for later use (522). Once start of music has been detected, thread B analyzes received data for the end of music (524). A pointer is stored to the location in memory where the end of music condition is indicated (526).

Thus, the function of thread B is to identify the starting and ending points which delimit the information for which recording is desired. The amount of memory available is such as to permit complete storage of most songs. If a song of average length is received, then, it will be stored completely in RAM 420 of FIG. 4 before the starting point is overwritten by thread A. Thus, at any time during the song, all of the information will be available in RAM 420 to record the entire song onto tape in recorder 320 of FIG. 3.

When, during performance of a piece of music on the radio, one decides to record the music from the beginning, record button 430 of FIG. 4 is pushed (530-thread C). Once the record button has been pushed, record control output 350 of FIG. 3 is activated over the I/O interface 430 and record control block 450 of FIG. 4 to cause recorder 320 to begin recording (532) and reading of data, beginning with the location pointed to by the start of music pointer begins. The data read from memory is supplied to digital to analog converter 315 of FIG. 3 to be provided to the recording input of tape recorder 320 (see 534). Reading of data continues until the address read is equal to the location pointed to by the end of music pointer set in block 526. When the stop button is pushed or when the read address equals the address of the end of music pointer, the stop pointer is set to the current memory write location 535 and when the memory read address equals the location indicated by the stop pointer, the external record function is deactivated (540).

In this way, a decision to record a song can be made up until the end of the song and the entire information related to the song can be captured in recorded form.

Figure 6:
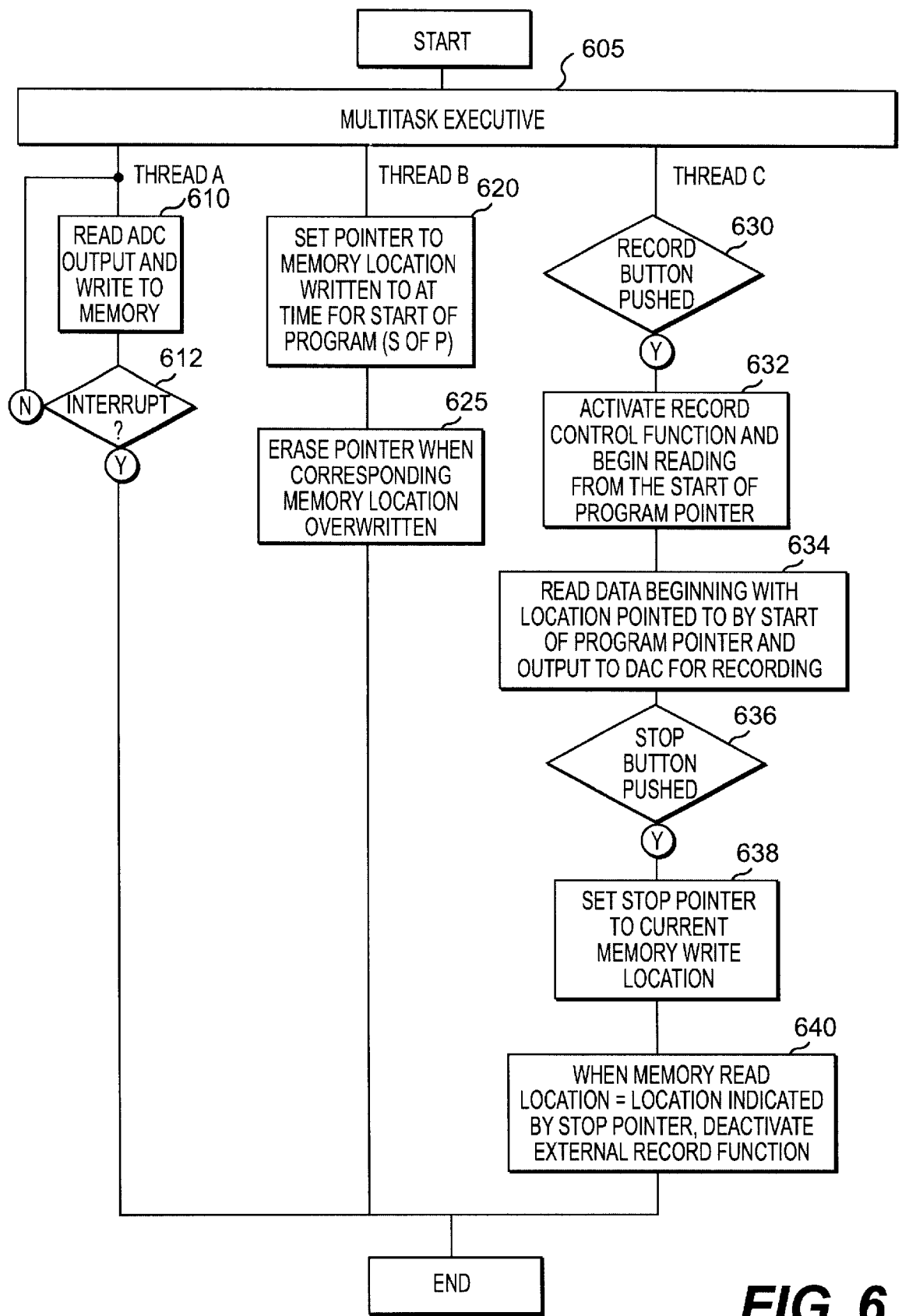
FIG. 6 is a flow chart of software implementing a video recorder version of the invention in which only limited memory is available for the delayed recording.
Figure 7:
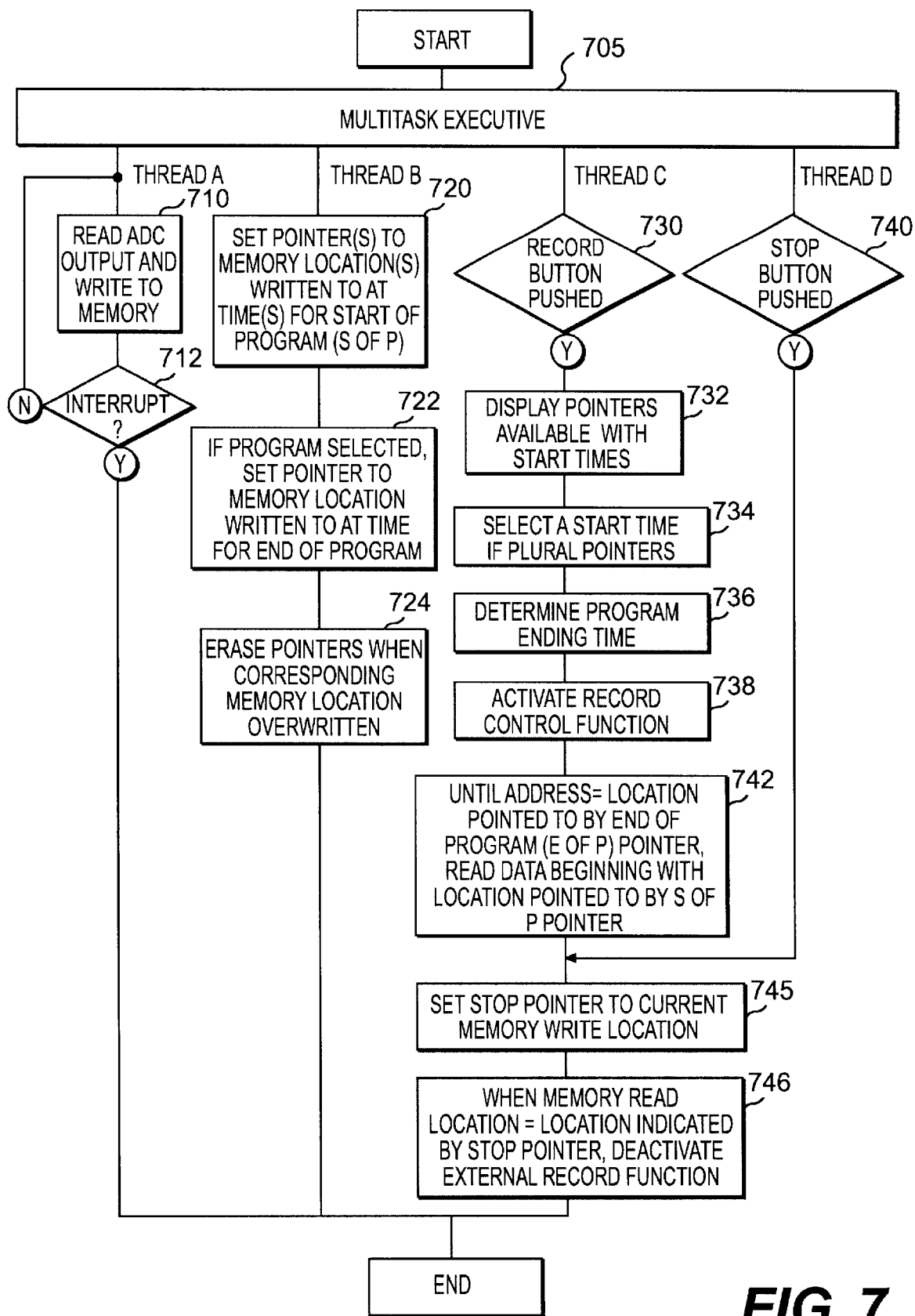
FIG. 7 is a flow chart of software implementing a video recorder version of the invention in which unlimited memory is available for the delayed recording, that is sufficient memory is available to permit recording of more than one program's information.

FIG. 6 illustrates a video recorder implementation of the invention in which only limited memory is available for the delayed record function. In this embodiment of the invention, video information is received from the program source. Video information differs from music or audio information in that it has a much higher band width and a much larger amount of storage is required to capture an equivalent time period of a program. Because of the large band width of video information, it may be desirable to include an amount of storage such as RAM 420 of FIG. 4 which represents only a relatively small portion of the amount required to store the entire video program. When available memory is limited, this embodiment is preferred. When there are no effective limits on memory availability, the embodiment of FIG. 7 is preferred.

In FIG. 6, the multi task executive and thread A are substantially identical with that shown in FIG. 5. In thread B, since the program is of such a length that the available memory will be overwritten many times during the course of recording a program, there is no effective way to determine the memory location or generation at which the stopping point will be found. Accordingly, in thread B, a pointer is set to the memory location written to at the time for a start-of-program. Instead of random access memory, a loop of video tape could also be used.

When utilizing video sources of information, a number of techniques for identifying a start-of-program may be utilized. The easiest to implement is a simple time function. In the video broadcast industry, it is common to start programs on the half hour. Thus, the memory location written to on exactly the half hour may be stored in a pointer and kept until such time as the memory location to which the pointer points is overwritten (625). If the record button is pushed (630) before the start-of-program material pointer is erased, the record control function will be activated and information will be read from RAM beginning with the location pointed to by the start-of-program pointer (632 and 634). If a stop button is pushed (636), a stop pointer will be set to the current memory write location to identify the stop point (638). When the memory read location equals the location in memory indicated by the stop pointer, the record control function will be deactivated and recording will stop (640). This allows the information in the RAM to be transferred to tape prior to ending the physical recording. Thus, all of the information expected to be captured on tape at the time the stop button was pushed will be recorded although the actual recording will end at a point in time delayed from the time when the stop button was pushed.

As an alternative to identifying start times of video programming information based on use of a clock, other methods are available. In one, program start/stop information may be available from an electronic TV guide downloaded over an external communications link, such as satellite broadcast or a landline data feed. The data received from such electronic program guides can be utilized to identify the starting and stopping times of particular programs and particular video channels on which the programs might be available.

FIG. 7 illustrates a flow chart implementation of the invention in which sufficient memory is available for the delayed record function. Multi task executive 705 and thread A are substantially identical to that described in FIG. 5. This implementation assumes that the capacity of the delay element is substantially unlimited as when the capacity of RAM 420 of FIG. 4 might be sufficient to contain several hours of video information. In this embodiment, semiconductor memory would not be preferred for implementing Random Access Memory. Rather, an array of semiconductor disks or arrays of magnetic storage would be arranged to provide the performance required and the storage capacity required to store the quantities of data needed to implement this version of the invention. Under these circumstances, a number of programs could start before data overwrote the starting location for a particular program. Pointers would be set for each memory location written to at the time a start-of-program (720) occurred. If a program were selected (734 of thread C), one would set a pointer to the memory location written to at the time for the end of the program selected (720). Any time a memory location corresponding to a pointer is overwritten, the pointer would be erased (724). In thread C, at the time a record button was pushed (730), a plurality of starting pointers might well be stored in Random Access Memory. Each of those starting pointers would be displayed with an indication of the start time associated with the pointer (732). A user would select the desired start time (734). Once a program was selected by selecting a start time, the corresponding ending time is determined (736) and the record control function activated to enable recording of the desired program. Data is read starting with the location pointed to by the start-of-program pointer selected and writing continues until the address read equals to the location in memory pointed to by the end of program pointer (742). When the stop button is pushed or when the read address equals the address of the end of music pointer, the stop pointer is set to the current memory write location 745 and when the memory read address equals the location indicated by the stop pointer, the external record function is deactivated (746).

Figure 8:
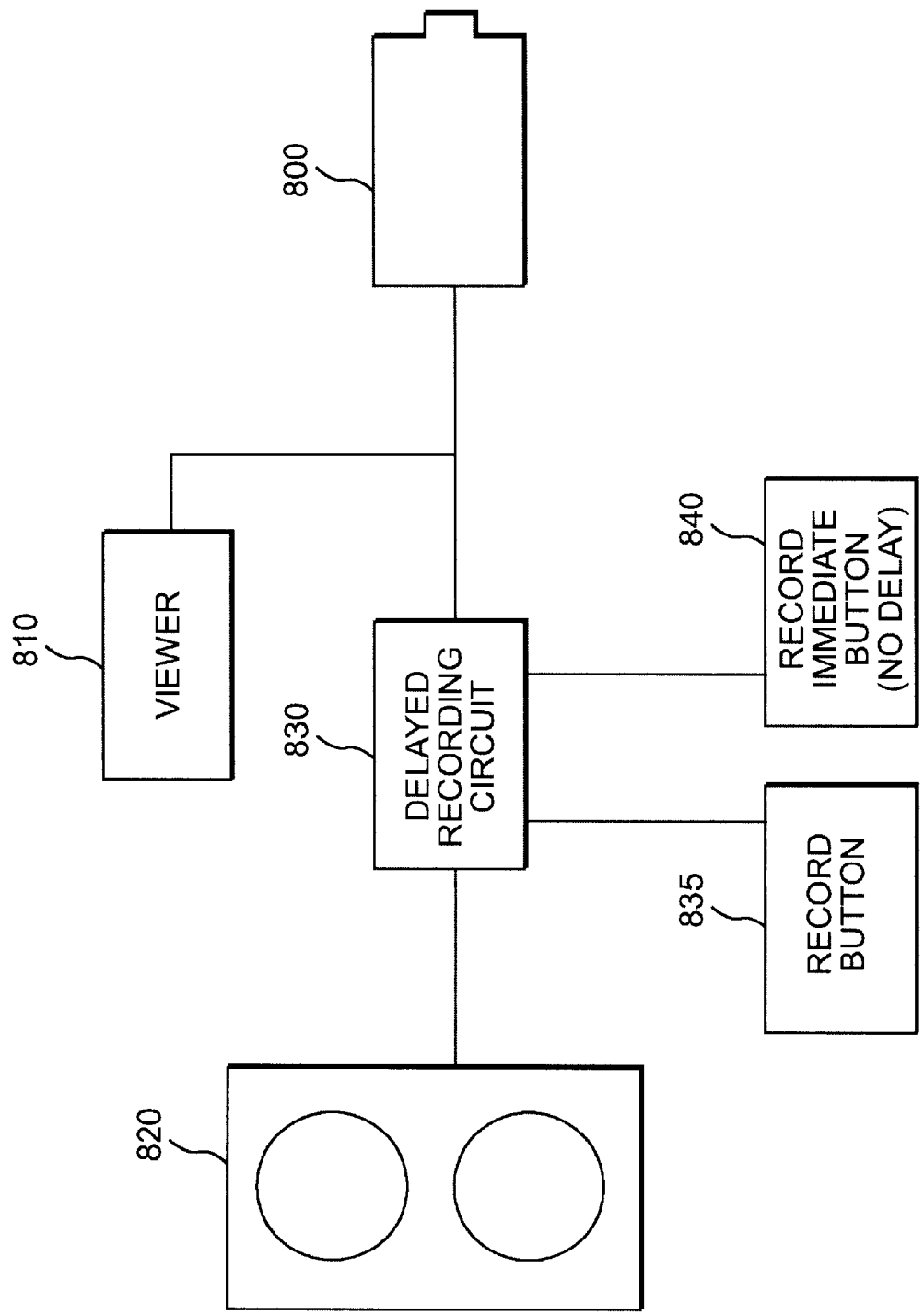
FIG. 8 illustrates a block diagram of a portable video camera containing the invention.

FIG. 8 illustrates a block diagram of a portable video camera containing the invention. The output from video camera 800 can be viewed in viewer 810. Recording unit 820 is connected to receive the output of video camera 800 either directly or through a delay mechanism depending upon which of record button 835 or record immediate button 840 is pressed. Items 800, 810 and 820 represent a standard video camera recorder combination widely available from a number of different manufacturers. Delayed recording circuit 830 is essentially that described with reference to FIGS. 3 and 4 above with minor differences. As shown in FIG. 8, two different recording modes are indicated. Also, because of size constraints imposed by the portable nature of video cameras, the delay element can be expected to handle only a limited amount of video information, such as 15 seconds.

Figure 9A:
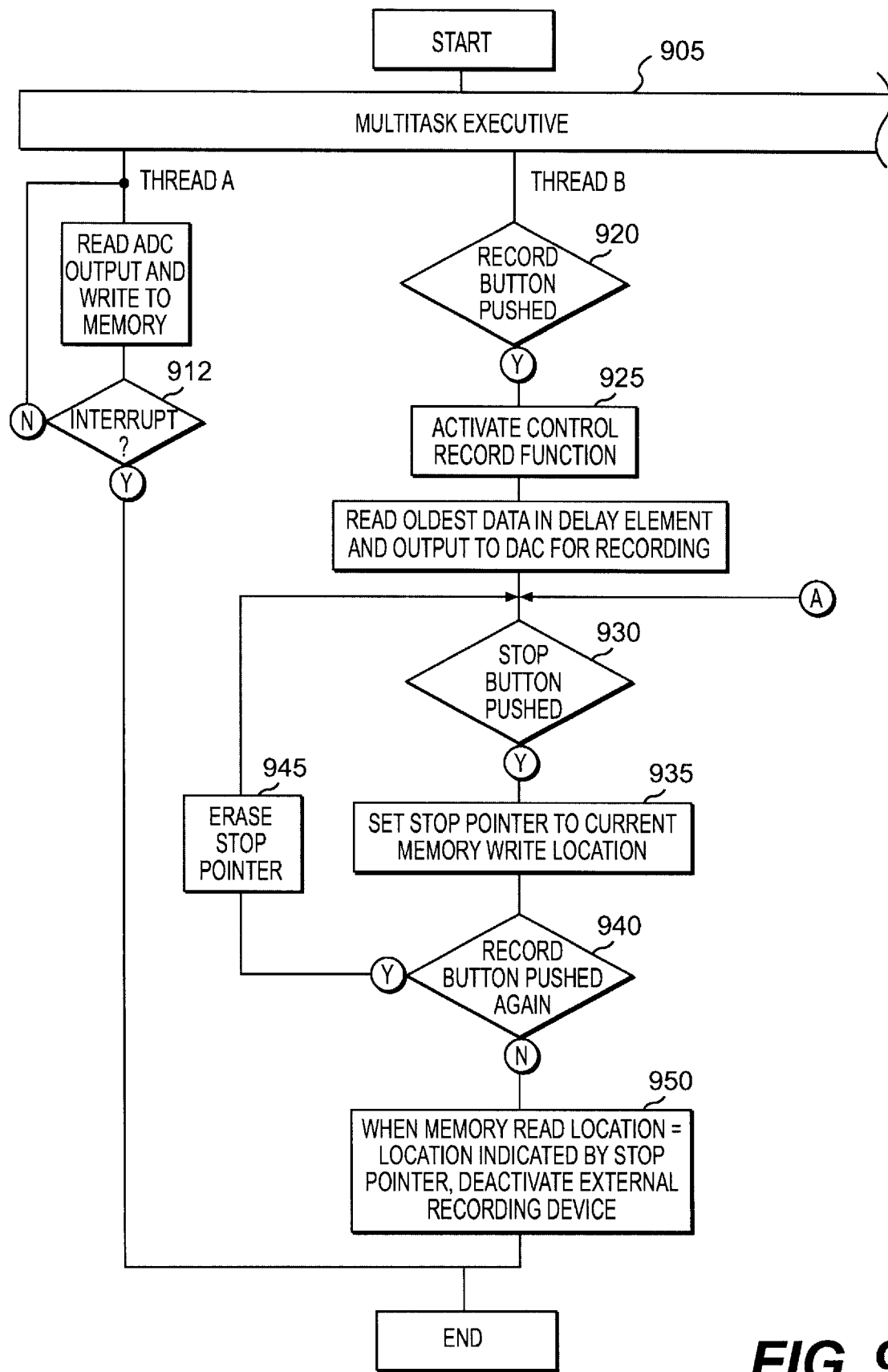
FIGS. 9A and 9B are a flow chart of software for carrying out a video camera version of the invention.
Figure 9B:
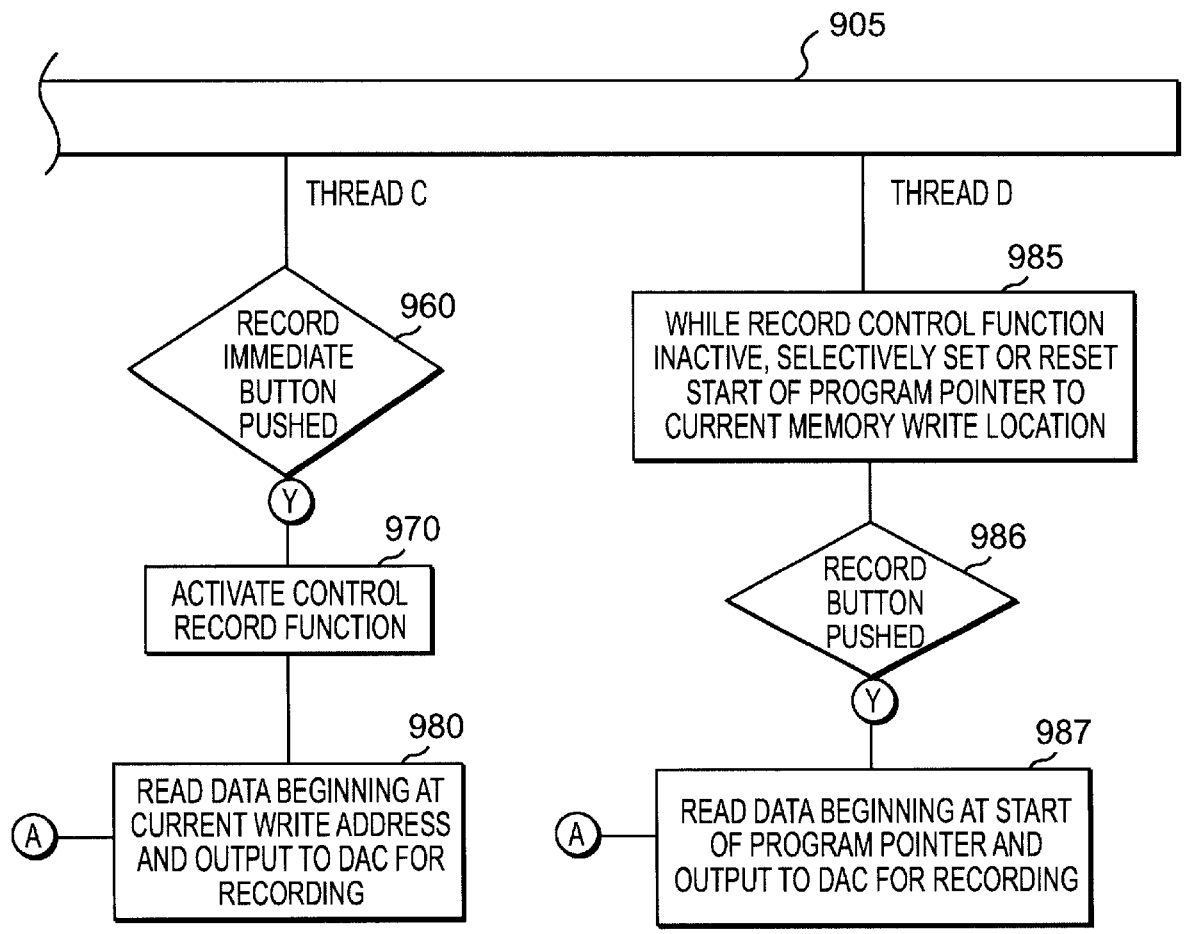

FIGS. 9A and 9B are a flow chart of software for carrying out a video camera embodiment of the invention. Multi task executive 905 and thread A are the same in this embodiment as in the others. Threads B and C differ in that thread B reflects recording in the typical delayed fashion whereas thread C reflects a record immediate mode in which the delay is bypassed. Threads B and C converge before step 930 to permit common processing of stop and override of the stop functions.

Considering thread B, when the normal record button is pushed (920), the control record function is activated (925) and the oldest data stored in the delayed element is read and output to the digital to analog converter for recording (926).

In thread C, when the record immediate button is pushed (960), the control record function is activated (970) and data is read beginning at the current write address and output to the DAC for recording (980). Thus far, the only difference between thread B and thread C is which record mode is activated and whether or not the information to be recorded is read with or without delay.

Thread D implements a reset function which allows a start-of-program pointer to be set at an arbitrary point in time even when not recording. For example, when one's child goes up to bat in a baseball game, one might wish to set a start-of-program pointer in the event that something worthy of recording occurs (985). If something worthy of recording does occur, the record button is pushed (986), the control record function is activated and data is read beginning with the start-of-program pointer and output to the DAC for recording (987). The reset function thus selectively eliminates undesired information from the beginning of recorded material. Monitoring for activation of a stop button then occurs via connector A and block 930 of FIG. 9A.

If a stop button is pushed (930) in either thread B, thread C or thread D, a stop pointer would be set at the current memory write location (935). When the memory read location equals the location indicated by the stop pointer, the control record function will be deactivated and recording will stop (950). That will happen almost immediately in the case of thread C because the memory read address will be the address of the stop pointer because no delay is entertained between receipt of data in the delay element and passing it to the recording element for permanent recording. However, when using delayed recording as shown in thread B, substantial time will exist between pressing the stop button and the time when the memory read location is equal to the location indicated by the stop pointer in step 950. If, during that time, the record button is pushed again (940), the stop pointer will be erased and the recording mode will continue as if there had been no interruption. Thus, in the delayed recording mode, one can reverse the decision, after the fact, to stop recording and have the recording continue without interruption. This functionality is, of course, not available in existing recording equipment and is effectively bypassed in the thread C record immediate mode.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for recording information segments from a source, comprising:

a. a recording device for recording information signals;

b. a control circuit configured to receive the information signals continuously from the source, identify a starting point of an information segment included in the signals by analyzing energy levels associated with the signals, and activate the recording device to record the information segment from said source; and c. an interface coupled to said control circuit that receives a selection from a user identifying the information segment and causes the control circuit to activate the recording device to record the information segment from the starting point.

2. A portable recording device, comprising:

an information capture module for generating information reflecting an environment;

a control module configured to receive the information and activate a recording module to record the information; and an interface coupled to the control module for receiving a request from a user to set a starting time and, at a time subsequent to the starting time, cause the control module to activate the recording module to record the information received by the control module from the starting time.

3. The device of claim 2 in which said control module is a digital device and, when a stop button is selected, the digital device marks a location in memory with a stop pointer where information was last recorded when the stop button was selected.

4. The device of claim 3 in which the digital device stops the information capture module from recording when the stop pointer points to a memory location being read by the digital device.

5. A recording system, comprising:

a recording device for recording information;

a control module for receiving the information from a source and activating the recording device; and an interface coupled to the control module for:

receiving, from a user, a starting point reflecting an arbitrary point in time and causing the control circuit to activate the recording device to begin recording the information from the starting point, and receiving, from the user, a first stopping point reflecting a time when the recording device is to stop recording the information, wherein the control module introduces a delay between the source and the recording device that allows the user to change, after the recording device begins recording, the first stopping point to a later stopping point without interrupting the recording.

6. A method for recording information provided by a source to a recording device, the method comprising the steps of:

receiving, from a user, a starting point reflecting an arbitrary point in time;

introducing a delay to the information provided by the source to the recording device;

receiving, from the user subsequent to the starting point, a first record command that directs the recording device to record the information;

recording the information from the starting point in response to the first record comma receiving, from the user, a first stop command that directs the recording device to stop recording;

receiving, from the user, a second record command at a time subsequent to receiving the first stop command; and recording, via the time delay, the information uninterrupted from the first starting point to a second stop command received subsequent to the second record command.

* * * * *

UNITED STATES PATENT AND TRADEMARK OFFICE
CERTIFICATE OF CORRECTION

PATENT NO.     : 6,614,986 B2
DATED          : September 2, 2003
INVENTOR(S)    : Bruce Tognazzini It is certified that error appears in the above-identified patent and that said Letters Patent is hereby corrected as shown below:

Column 10,
Line 32, "comma" should read -- command; --

Signed and Sealed this

Twentieth Day of January, 2004

JON W. DUDAS
*Acting Director of the United States Patent and Trademark Office*